United States Patent [19]

Richards et al.

[11] Patent Number: 5,303,045
[45] Date of Patent: Apr. 12, 1994

[54] STANDARDS CONVERSION OF DIGITAL VIDEO SIGNALS

[75] Inventors: John W. Richards, Stockbridge; Clive H. Gillard, Basingstoke; Stephen M. Keating, Reading, all of United Kingdom

[73] Assignee: Sony United Kingdom Limited, Staines

[21] Appl. No.: 933,932

[22] Filed: Aug. 24, 1992

[30] Foreign Application Priority Data

Aug. 27, 1991 [GB] United Kingdom ............... 9118340

[51] Int. Cl.⁵ .............................................. H04N 7/01
[52] U.S. Cl. ..................................... 348/443; 348/699
[58] Field of Search ................. 358/140, 11, 105; H04N 7/01

[56] References Cited

U.S. PATENT DOCUMENTS

| 4,609,941 | 9/1986 | Carr et al. | 358/140 |
| 4,698,674 | 10/1987 | Bloom | 358/140 |
| 4,876,596 | 10/1989 | Faroudja | 358/140 |
| 4,891,701 | 1/1990 | Shikina et al. | 358/140 |

FOREIGN PATENT DOCUMENTS 2223141 3/1990 United Kingdom .
2223144 3/1990 United Kingdom .

Primary Examiner—Victor R. Kostak
Attorney, Agent, or Firm—William S. Frommer; Alvin Sinderbrand

[57] ABSTRACT

An input digital video signal is converted to an output digital video signal having a different frame rate and a different number of pixel lines per frame. A first series of progressive scan format frames is formed from the input signal. Then a second series of frames is formed from the first series of frames using motion compensated temporal interpolation between successive frames of the first series in producing at least some of the frames of the second series so as to provide the difference in frame rate. Before or after the second series of frames is formed, vertical spatial interpolation is performed so as to provide the difference in the number of pixel lines per frame.

17 Claims, 11 Drawing Sheets

PRECEEDING (OR ALIGNED) FRAME    OUTPUT FIELD    SUCCEEDING FRAME

PRECEEDING (OR ALIGNED) FRAME    OUTPUT FIELD    SUCCEEDING FRAME

STANDARDS CONVERSION OF DIGITAL VIDEO SIGNALS

BACKGROUND OF THE INVENTION

1. Field of the Invention

This invention relates to standards conversion of digital video signals.

2. Description of the Prior Art

Different format standards for high definition digital video are being established in different parts of the world. For example, the SMPTE 240M format has become established in the USA and is characterised by 1125 lines per frame, 2:1 interlace, 60 fields per second and an active pixel area of 1920 pixels (horizontally) by 1035 pixels (vertically) per frame. On the other hand, one of the "European" standards which is proposed is characterised by 1250 lines per frame, 2:1 interlace, 50 fields per second and an active pixel area of 1920 pixels (horizontally) by 1152 pixels (vertically) per frame. There will become a need for a gateway between two standard formats such as these, so that material originated in or converted to one of these high definition standards can be converted to the other standard.

OBJECT AND SUMMARY OF THE INVENTION

According, one object of the present invention is to convert an input digital video signal to an output digital video signal in which the input and output signals have different frame rates and different number of pixel lines per frame and in which the conversion method introduces no, or insignificant, artifacts into the picture represented by the output signal.

One aspect of the present invention provides a method comprising the steps of: forming a first series of progressive scan format frames from the input signal; forming a second series of frames from the first series of frames using motion compensated temporal interpolation between successive frames of the first series in producing at least some of the frames of the second series so as to provide the difference in frame rate; and performing vertical spatial interpolation so as to provide the difference in the number of pixel lines per frame.

By employing motion compensated temporal interpolation and additionally vertical spatial interpolation, the conversion method causes little degradation of the output picture. A method of performing motion compensated temporal interpolation is described in detail in United Kingdom patent application No. GB 2231228 A published 7 Nov. 1990 (hereinafter referred to as "the Earlier Application") the content of which are incorporated herein by reference as if printed in full below.

In the case where the output video signal has a greater number of active pixel lines per frame than the input video signal (for example when converting from SMPTE 240M to European format), the vertical spatial interpolation to increase the number of active pixel lines per frame is preferably performed after the motion compensated temporal interpolation. Alternatively, in the case where the output video signal has a lesser number of active pixel lines per frame than the input video signal (for example when converting from European format to SMPTE 240M), the vertical spatial interpolation to decrease the number of active pixel lines per frame is preferably performed before the motion compensated temporal interpolation. By performing the interpolations in these orders, the numbers of pixels per frame which need to be produced by motion compensated temporal interpolation are reduced.

Preferably, in the case where the input signal has a 2:1 interlaced field scan format, in the step of forming the first series of progressive scan format frames a respective frame in the first series is formed for each field of the input signal. Also, to provide more processing time and to allow monitoring of the conversion process in slow motion, the fields of the input signal are preferably repeated with a repeat rate of N times and a new frame of the first series is produced for every N fields of the repeating input signal.

In the case where the output signal has a 2:1 interlaced field scan format, each frame of the second series comprises a pair of 2:1 interlaced fields and preferably different amounts of temporal interpolation are used for successive fields of the second series. In particular, in the case where the input signal has a 2:1 interlaced field scan format with a field rate of about 60 Hz and the output signal has a 2:1 interlaced field scan format with a lower field rate of 50 Hz (for example when converting from SMPTE 240M to European format), preferably four of a group of five successive fields in the second series are produced by temporal interpolation $o+0.2$, $o+0.4$, $o+0.6$ and $o+0.8$ (where o is a constant offset), respectively, of the way between respective successive frames in the first series. In this case, the constant offset "o" may advantageously be 0.1. Alternatively, in the case where the input signal has a 2:1 interlaced field scan format with a field rate of 50 Hz and the output signal has a 2:1 interlaced field scan format with a higher field rate of 60 Hz (for example when converting from European format to SMPTE 240M), preferably five of a group of six successive fields in the second series are produced by temporal interpolation in the ratios $o+0.833$, $o+0.667$, $o+0.5$, $o+0.333$ and $o+0.167$ (where o is a constant offset), respectively, of the way between respective successive frames in the first series. In this case, the constant offset "o" may advantageously be 0.083. In either case, the constant offset "o" may alternatively be zero, and in this case, the remaining field of the group may be produced without temporal interpolation. However, the remaining field in the group may alternatively be produced by temporal interpolation "o" of the way between respective successive frames in the first series, in order to reduce noise level modulation. Furthermore, the value of each pixel in each field of the second series may beneficially be derived from values of the respective pixels in the respective successive frames which are weighted in accordance with the respective amount of temporal interpolation.

In another aspect, the invention provides a digital video signal conversion apparatus, comprising a digital video signal reproducing apparatus for providing a source digital video signal having a first frame rate and a first number of pixel lines per frame; a digital video signal recording apparatus for recording a supplied digital video signal having a second frame rate different to said first frame rate and a second number of pixel lines per frame different to said first number; and means for performing the method of the first aspect of the invention, said means being connected between the reproducing apparatus and the recording apparatus for converting the format of the source signal to that of the supplied signal.

Other objects, features and advantages of the present invention will become apparent upon consideration of the following detailed description of a preferred embodiment thereof, especially when considered with the accompanying drawings in which like reference numerals are employed to designate the same or similar components in the different figures.

DETAILED DESCRIPTION OF THE PREFERRED EMBODIMENT

Figure 1:
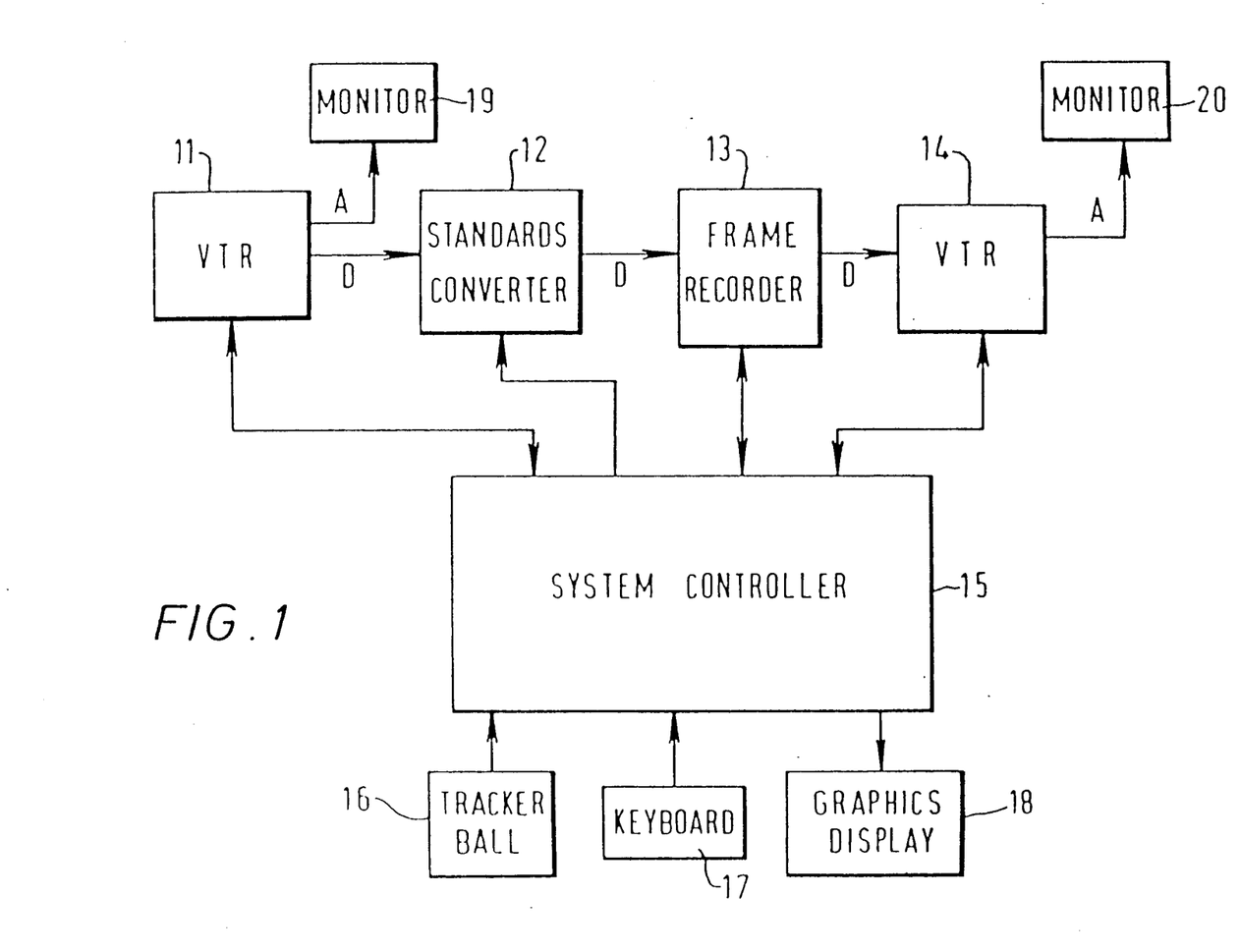
FIG. 1 is a block diagram of a video signal conversion apparatus.

As described in detail in the Earlier Application, and as will now be briefly described with reference to FIG. 1, standards conversion of a high definition digital video from one field/frame rate to another may be performed by reproducing the signal to be converted at slow speed with repeated fields/frames using a digital video tape recorder (VTR) 11 and supplying the signal to a standards converter 12, by converting the signal in the standards converter 12 and outputting the converted signal with repeated fields/frames, by temporarily storing one of the repeats of each field/frame in a frame recorder 13, and by outputting bursts of the temporarily stored fields/frames from the frame recorder 13 for recording by a digital VTR 14. Each of the elements thus far described is controlled by a system controller 15 with associated input and output devices 16, 17, 18, and monitors 19, 20 are provided for displaying the input and output signals.

Figure 2:
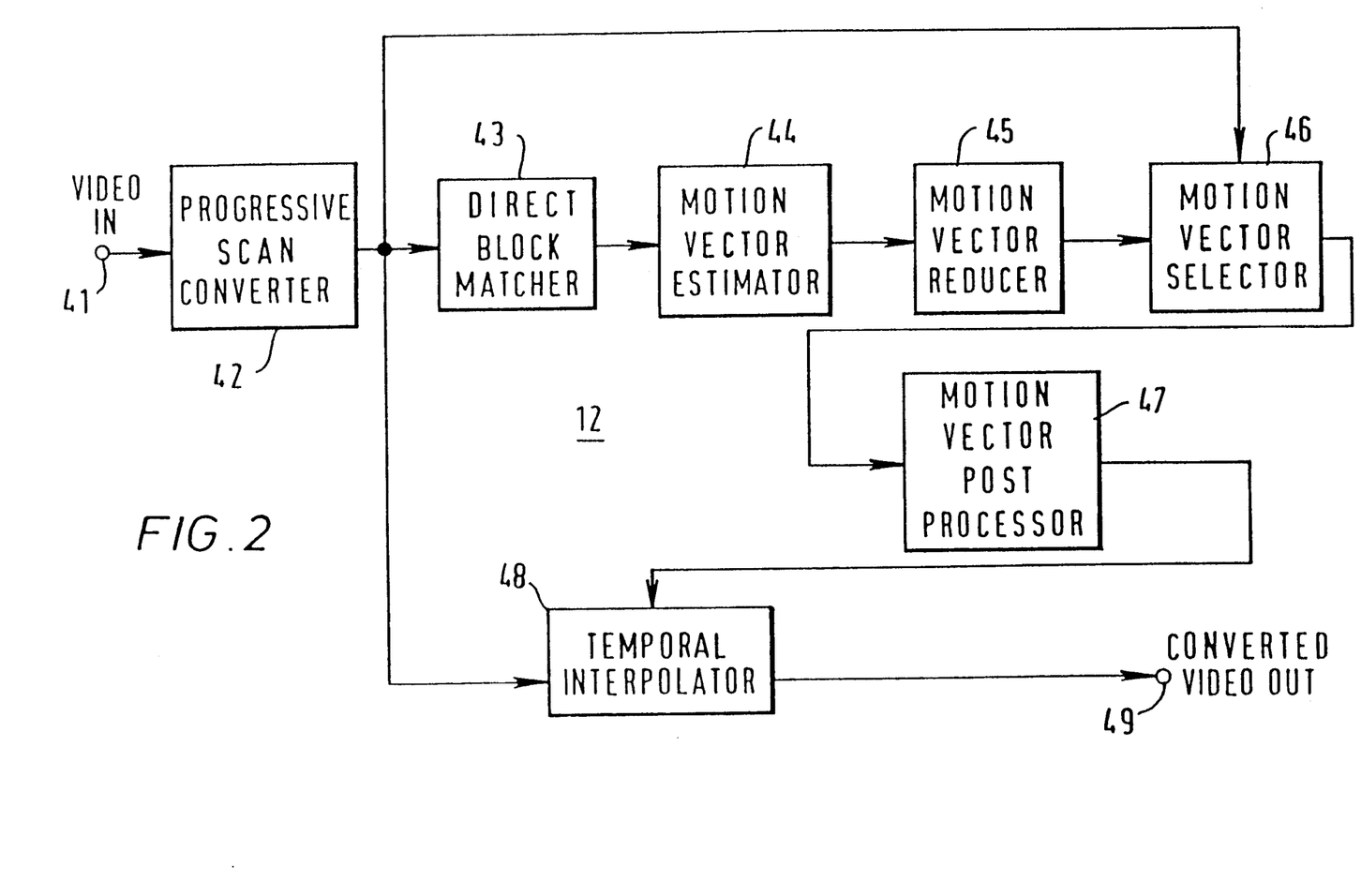
FIG. 2 is a block diagram of part of the apparatus of FIG. 1, as described in the Earlier Application.

As described in detail in the Earlier Application, and as will now be briefly described with reference to FIG. 2, the standards converter 12 may comprise a progressive scan converter 42 which forms series of progressive scan frames from the input fields/frames, and a motion compensated temporal interpolator 48 which produces from the progressive scan frames output fields/frames which are not all temporally aligned with the progressive scan frames. In order to do this, a series of elements 43 to 47, which are described in detail in the Earlier Application, produce for each pixel (or path of pixels) in a output field/frame a motion vector, and the value of each pixel in at least a non-temporally aligned output frame is derived from the values of the pixels in the temporally preceding and succeeding progressive scan frames which are spatially offset from the output pixel by vectors dependent upon the respective motion vector and the temporal offset of the output field/frame between those two progressive scan frames.

In the arrangements described in the Earlier Application, although the high definition video signal may represent various formats, it is of one of two electrical formats, that is 60 field/s 2:1 interlace format or 30 frame/s progressive scan format. For example, the signal may be to SMPTE 240M standard, which has the additional characteristics of 1125 lines per frame and 1920×1035 active pixels per frame. There are other standards or contemplated standards for high definition video signals, such as the proposed European standard which is characterised by 1250 lines/frame, 50 field/s 2:1 interlace with 1920×1152 active pixels per frame. The arrangement described in detail in the Earlier Application may be modified so as to convert between the SMPTE 240M standard and the European standard, as described below.

Figure 5A:
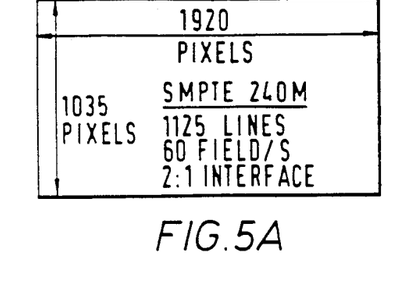
FIGS. 5A and 5B illustrate the SMPTE 240M and European standard formats.
Figure 5B:
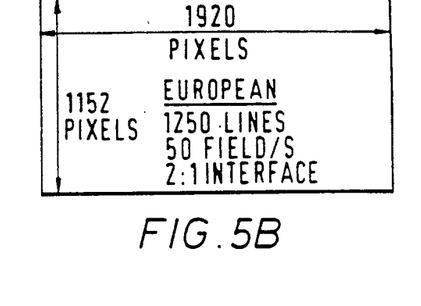

FIGS. 5A and 5B illustrate frames according to the SMPTE 240M standard and the European standard respectively. It will be appreciated that, for conversion between these standards, account needs to be taken of the change in the number of pixel lines per frame (from 1035 to 1152, or vice versa) in addition to the change in field rate (from 60 Hz to 50 Hz, or vice versa).

Figure 3:
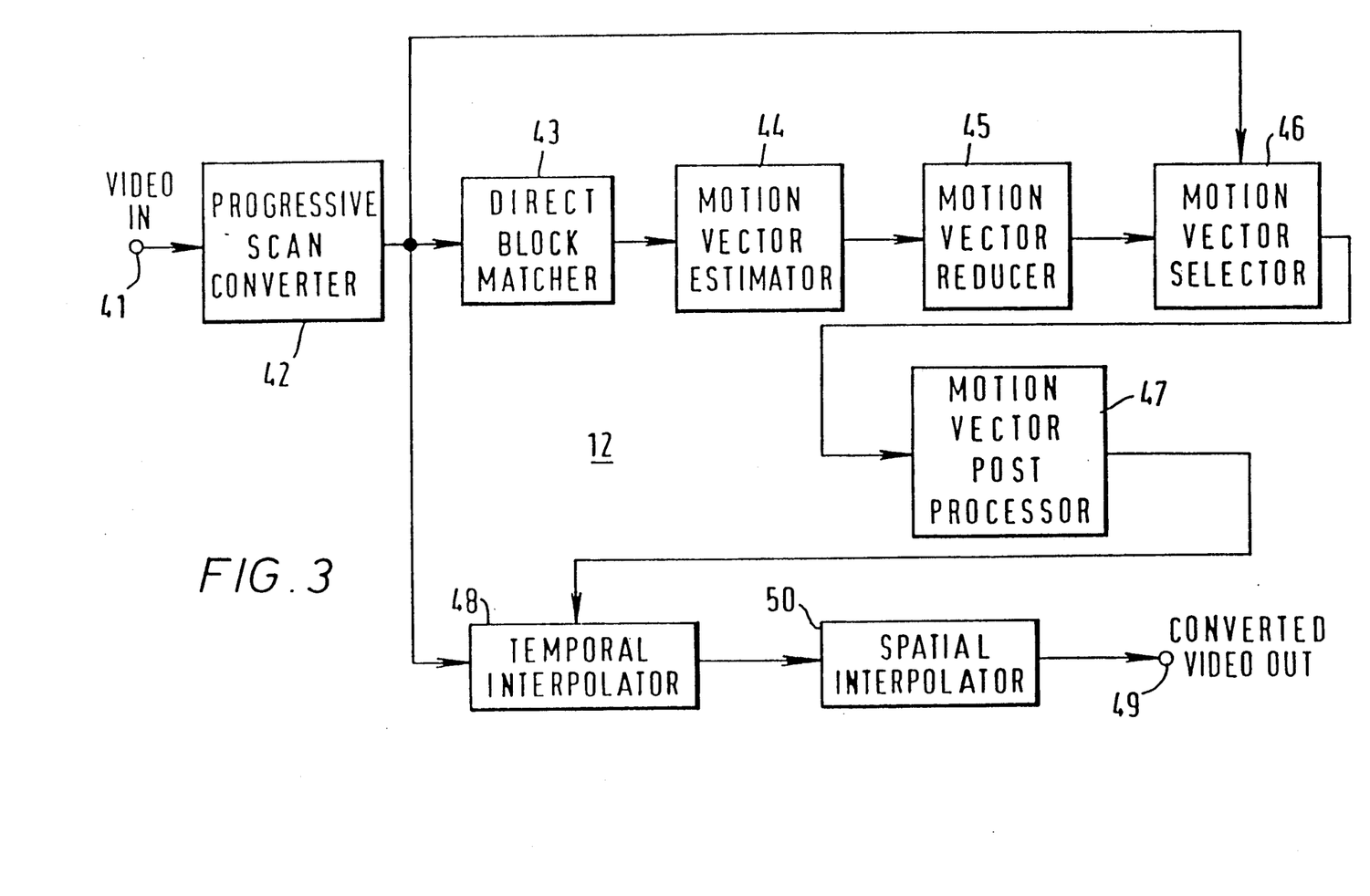
FIG. 3 shows a modification to the apparatus of FIG. 2 as an example of the invention.
Figure 6:
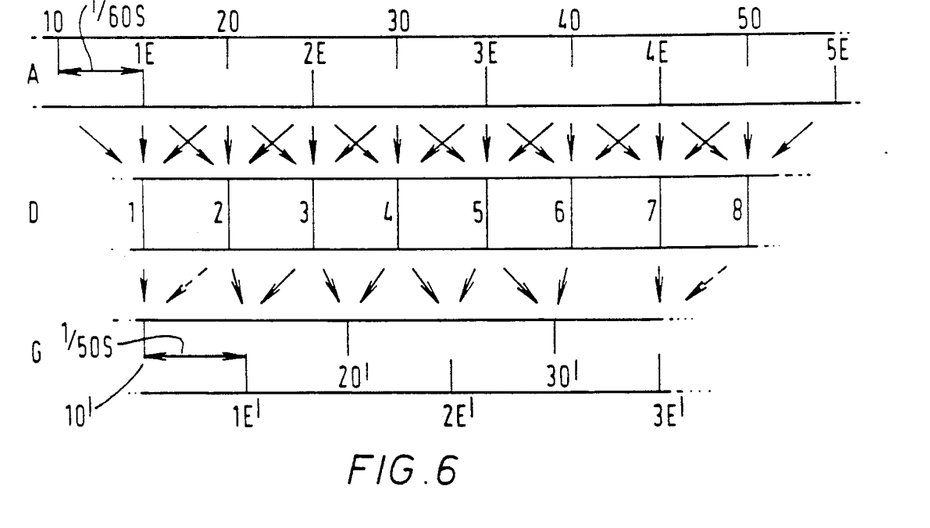
FIG. 6 shows an example temporal relationship between input and output fields when converting from SMPTE 240M to European format.

Considering firstly the change in field rate, in order to convert from SMPTE 240M to European standard, the scheme illustrated in FIG. 6 may be employed. The top part A of FIG. 6 signifies a series of five frames (1 to 5) of the input SMPTE 240M signal, each frame having and odd (O) or even (E) field. From the input series A, a series D of progressive scan format frames (1 to 8) is formed, employing a motion adaptive technique described in detail in the Earlier Application, using the progressive scan converter 42 (FIG. 3). The frames of the series D therefore have a frame rate of 60 Hz. The series D of frames is then applied to the interpolator 48 and associated circuitry 43 to 47 (FIG. 3) so as to produce, employing the motion compensated temporal interpolation technique, a series G of fields 10′, 1E′... 3E′ which are 2:1 interlaced with a field rate of 50 Hz, thus in accordance with the European standard for field rate.

Further details of the field rate conversion operation will now be described with reference to FIGS. 7A and 7B, collectively called FIG. 7. (The top of FIG. 7B follows on the bottom of FIG. 7A.) The left-hand column A represents a series of fields 10′, 1E′, 20, 2E ... on a video tape which is reproduced by the VTR 11 (FIG. 1) (which in this case is an SMPTE 240M standard VTR) playing at one-twentieth speed, so that each field is repeated twenty times as shown in column B. One in every twenty of the repeated fields is stored in one of three field stores C1, C2, C3 in the progressive scan converter 42 (FIG. 3) so that the field stores contain the last three input fields, as shown in column C in FIG. 7. The progressive scan converter 42 forms from the triplets of fields in the field stores C1, C2, C3 two series of progressive scan frames 1, 2, 3 ..., as shown in column D, alternate frames of which are stored in frame stores D1, D2, so that these frame stores contain the last two progressive scan frames. The frames 1, 2, 3 ..., are produced using the motion adaptive technique described in detail in the Earlier Application. It should be noted that the frames stored in the frame stores D1, D2 are produced at the same rate as the input fields 10, 1E, 20, 2E ... are changed. The interpolator 48 (FIG.

3) then produces from the pairs of frames in the fame stores D1, D2 temporally interpolated fields 10', 1E', 20', 2E'... using a modified form of the motion compensated temporal interpolation technique described in the Earlier Application and which will be described in more detail below, as shown in column E. A fresh field is produced in column E for every 24 of the repeated input fields in column B, and each fresh field 10', 1E', 20', 2E'... produced by the interpolator 48 is repeated twenty times at 50 field/s, as shown in column E, and the repeated fields are output to the frame recorder 13 (FIG. 1). One in every twenty output fields is temporarily recorded by the recorder 13, as indicated in column F in FIG. 7, and intermittently bursts of the stored fields are output at 50 field/s, to the VTR 14 (FIG. 1) (which in this case is a European standard VTR) operated in an intermittent recording mode as shown by column G. Accordingly, the field rate of the material recorded by the VTR 14 is in the European format.

Figure 7A:
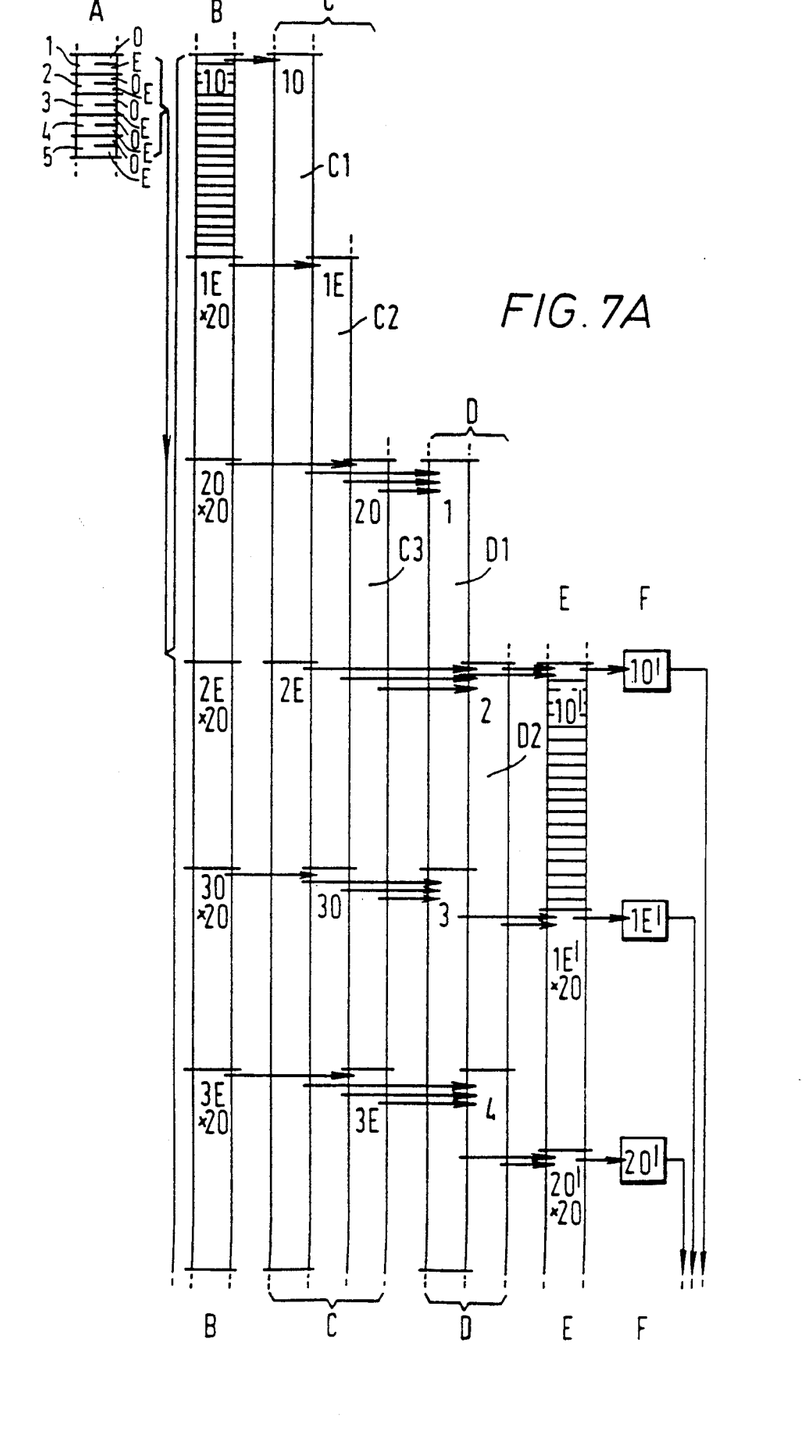
FIGS. 7A and 7B illustrate in more detail how such a conversion is carried out.
Figure 7B:
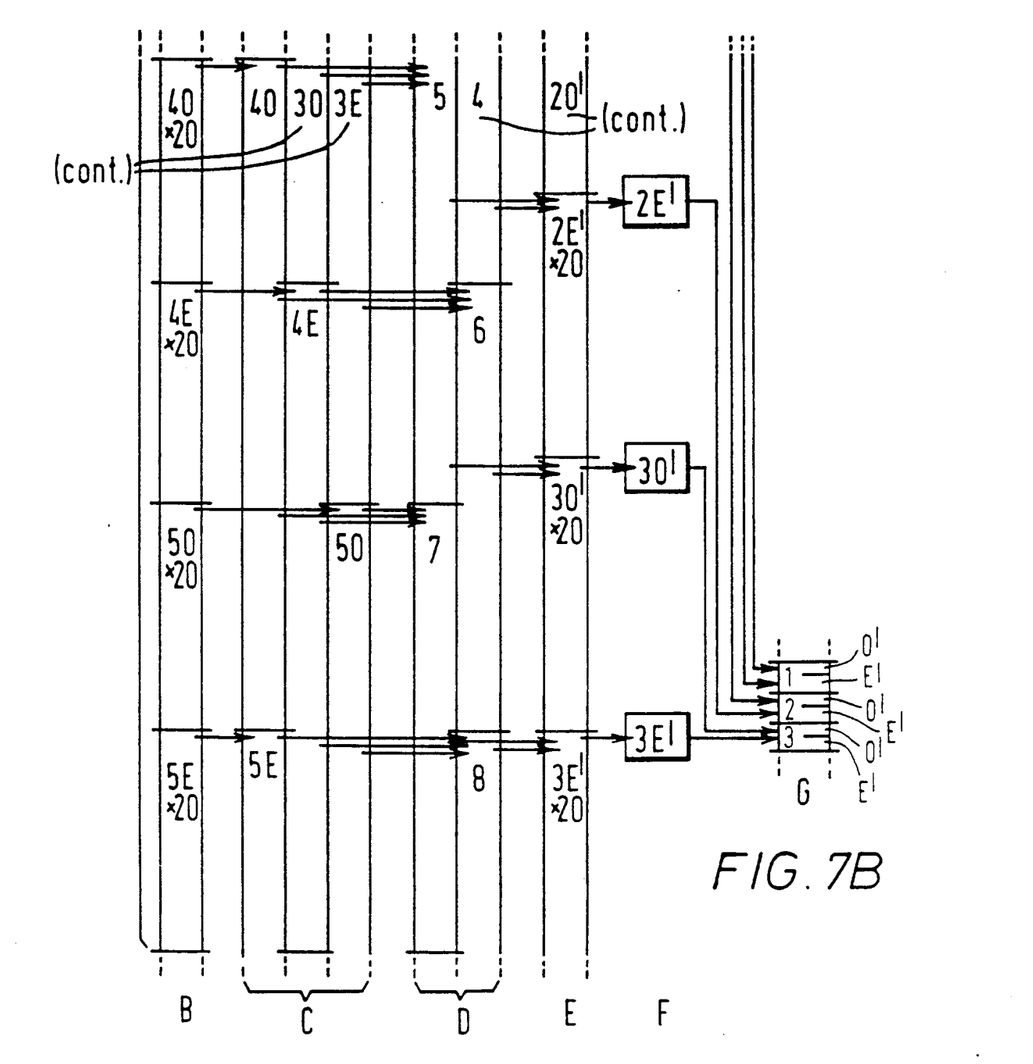
Figure 8A:
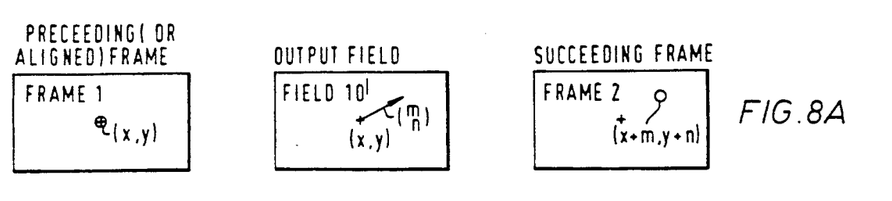
FIGS. 8A-8E illustrate the different temporal interpolation ratios employed in such conversion.

A difference between the arrangement of FIGS. 6 and 7 and that described in the Earlier Application is that the temporal resolution of the interpolator 48 is modified. As shown in FIG. 6, the first output field 10' is temporally aligned with the progressive scan frame 1, and therefore the field 10' may be generated merely by taking the odd lines of the frame 1. Alternatively, in order to reduce noise level modulation, the field 10' may be temporally interpolated at the aligned frame end of the motion vector, as shown in FIG. 8A, such that the value $O(x,y)$ of a pixel at location $(x,y)$ in the output field 10' is derived by averaging the value $P(x,y)$ of the pixel at (or patch centred on) the location $(x,y)$ in the preceding or aligned frame 1 and the value $S(x+m(x,y), y+n(x,y))$ of the pixel at (or patch centred on) a location $(x+m(x,y), y+n(x,y))$ in the succeeding frame 2 which is displaced by the motion vector $(m(x,y),n(x,y))$ from the output pixel location $(x,y)$. In other words, for output field 10':

$$O(x,y) = \{P(x,y) + S(x+m(x,y), y+n(x,y))\}/2.$$

Figure 8B:
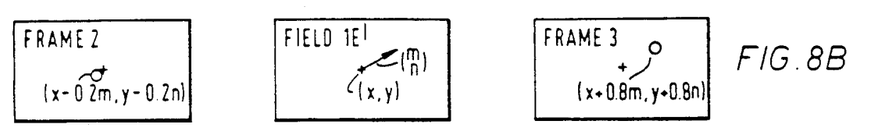

For the next output field 1E' the output pixels are interpolated one-fifth of the way along the respective motion vectors, as shown in FIG. 8B. In other words, for output field 1E':

$$O(x,y) = \{P(x-0.2m(x,y), y-0.2n(x,y)) + S(x+0.8m(x,y), y+0.8n(x,y))\}/2.$$

Figure 8C:
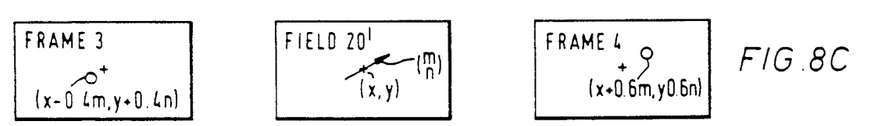
Figure 8D:
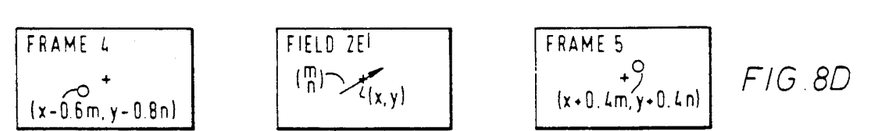
Figure 8E:
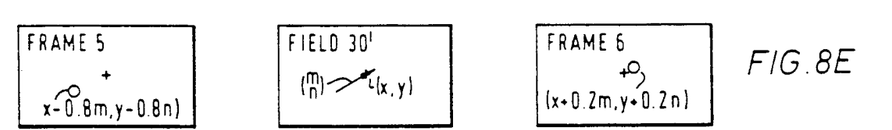

It follows that, for output fields 20', 2E' and 30', the output pixels are interpolated two-fifths, three-fifths and four-fifths, respectively, along the respective motion vectors, as shown by FIGS. 8C, 8D and 8E, respectively. That is to say:

Field 20':

$$O(x,y) = \{P(x-0.4m(x,y), y-0.4n(x,y)) + S(x+0.6m(x,y), y+0.6n(x,y))\}/2$$

Field 2E':

$$O(x,y) = \{P(x-0.6m(x,y), y-0.6n(x,y)) + S(x+0.4m(x,y), y+0.4n(x,y))\}/2$$

Field 30':

$$O(x,y) = \{P(x-0.8m(x,y), y-0.8n(x,y)) + S(x+0.2m(x,y), y+0.2n(x,y))\}/2$$

In addition to varying the distance along the respective motion vector for different fields in the five field output series 10' to 30', it is also advantageous in some circumstances to weight the values of the pixels in the preceding and succeeding frames P, S in accordance with the complement of the temporal offset, such that the output pixel values $O(x,y)$ for the different fields are generated as follows:

Field 10':

$$O(x,y) = 1\ OP(x,y) + 0\ OS(x+m(x,y), y+n(x,y))$$

or $$O(x,y) = P(x,y)$$

Field 1E':

$$O(x,y) = 0.8P(x-0.2m(x,y), y-0.2n(x,y)) + 0.2S(x+0.8m(x,y), y+0.8n(x,y))$$

Field 20':

$$O(x,y) = 0.6P(x-0.4m(x,y), y-0.4n(x,y)) + 0.4S(x+0.6m(x,y), y+0.6n(x,y))$$

Field 2E':

$$O(x,y) = 0.4P(x-0.6m(x,y), y-0.6n(x,y)) + 0.6S(x+0.4m(x,y), y+0.4n(x,y))$$

Field 30':

$$O(x,y) = 0.2P(x-0.8m(x,y), y-0.8n(x,y)) + 0.8S(x+0.2m(x,y), y+0.2n(x,y))$$

It should be noted that other temporal interpolation ratios are possible, for example 0.1, 0.3, 0.5, 0.7 and 0.9 of the way along the motion vector, and in this case and with pixel value weighting the output pixel values are calculated as:

Field 10':

$$O(x,y) = 0.9P(x-0.1m(x,y), y-0.1n(x,y)) + 0.1S(x+0.9m(x,y), y+0.9n(x,y))$$

Field 1E':

$$O(x,y) = 0.7P(x-0.3m(x,y), y-0.3n(x,y)) + 0.3S(x+0.7m(x,y), y+0.7n(x,y))$$

Field 20':

$$O(x,y) = 0.5P(x-0.5m(x,y), y-0.5n(x,y)) + 0.5S(x+0.5m(x,y), y+0.5n(x,y))$$

Field 2E':

$$O(x,y) = 0.3P(x-0.7m(x,y), y-0.7n(x,y)) + 0.7S(x+0.3m(x,y), y+0.3n(x,y))$$

Field 30':

$$O(x,y) = 0.1P(x-0.9m(x,y), y-0.9n(x,y)) + 0.9S(x+0.1m(x,y), y+0.1n(x,y))$$

This has the result of causing the output fields to lag by one tenth of field period behind those produced by the method shown in FIGS. 8A to 8E.

Figure 4:
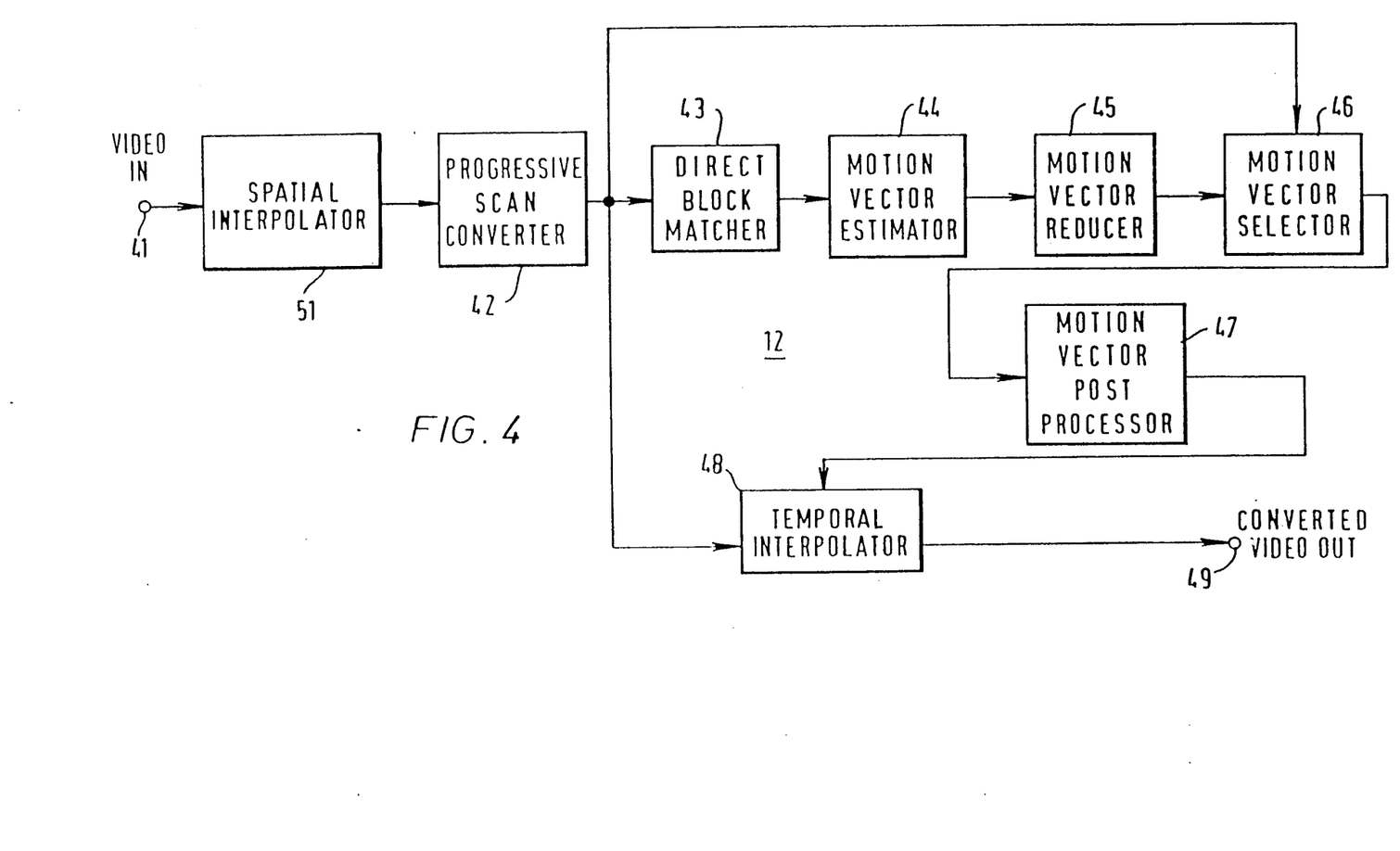
FIG. 4 shows a further modification to the apparatus of FIG. 2 as an example of the invention.
Figure 9:
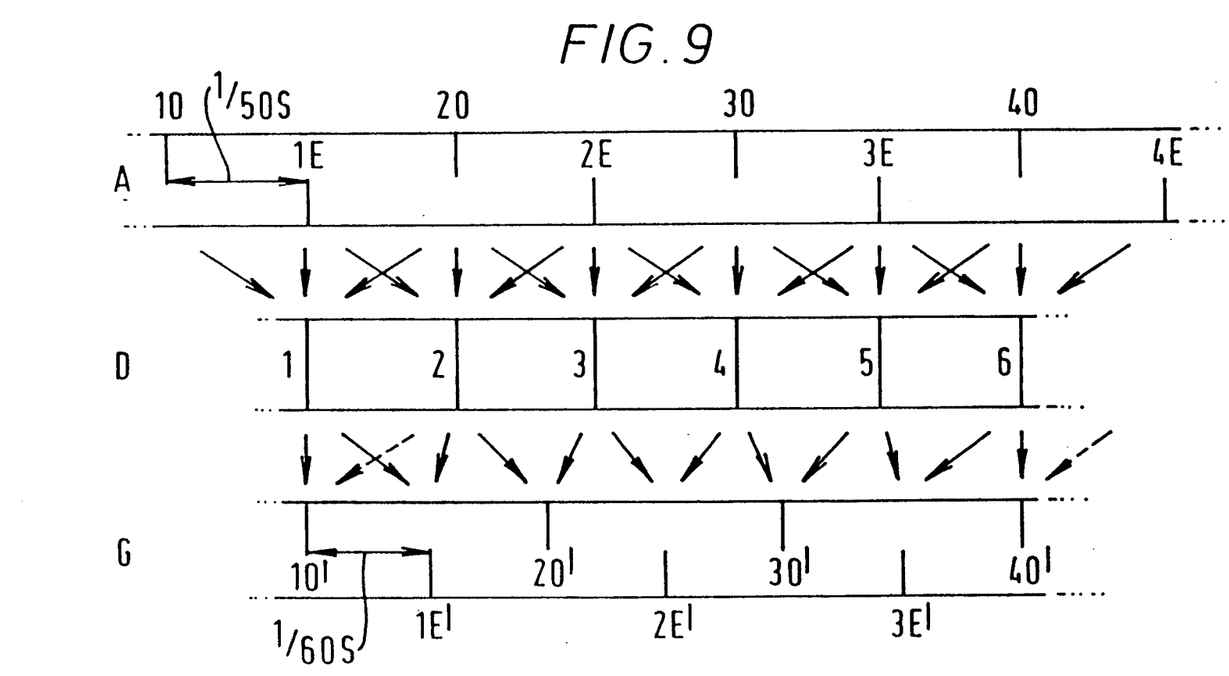
FIG. 9 shows an example temporal relationship between input and output fields when converting from European to SMPTE 240M format.

In order to convert the field rate from European standard to SMPTE 240M, the scheme illustrated in FIG. 9 may be employed. The top part A of FIG. 9 signifies a series of four frames (1 to 4) of the input European signal, each frame having an odd (O), and even (E) field. From the input series A, a series D of progressive scan format frames (1 to 6) is formed, employing the motion adaptive technique described in detail in the Earlier Application, using the progressive scan converter 42 (FIG. 4). The frames of the series D therefore have a frame rate of 50 Hz. The series D of frames is then applied to the interpolator 48 and associated circuitry 43 to 47 (FIG. 4) so as to produce, employing the motion compensated temporal interpolation technique, a series G of fields 10', 1E'. . . 4E' which are 2:1 interlaced with a field rate of 60 Hz, thus in accordance with the SMPTE 240M standard.

Further details of this field rate conversion operation will now be described with reference to FIGS. 10A and 10B, collectively called FIG. 10. (The top of FIG. 10B follows on the bottom of FIG. 10A.) The left-hand column A represents a series of fields 10, 1E, 20, 2E . . . on a video tape which is reproduced by the VTR 11 (FIG. 1) (which in this case is a European standard VTR) playing at one-twentieth speed, so that each field is repeated twenty times as shown in column B. One in every twenty of the repeated fields is stored in one of three field stores C1, C2, C3 in the progressive scan converter 42 (FIG. 4) so that the field stores contain the last three input fields, as shown in column C in FIG. 10. The progressive scan converter 42 forms from the triplets of fields in the field stores C1, C2, C3 two series of progressive scan frames 1, 2, 3 . . . , as shown in column D, alternate frames of which are stored in frame stores D1, D2, so that these frame stores contain the last two progressive scan frames. The frames 1, 2, 3 . . . , are produced using the motion adaptive technique described in detail in the Earlier Application. It should be noted that the frames stored in the frame stores D1, D2 are produced at the same rate as the input fields, 10, 1E, 20, 2E . . . are changed. The interpolator 48 (FIG. 4) then produces from the pairs of frames in the frame stores D1, D2 temporally interpolated fields 10', 1E', 20', 2E'. . . using a modified form of the motion compensated temporal interpolation technique described in the Earlier Application and which will be described in more detail below, as shown in column E. A fresh field is produced in column E for every 50/3 of the repeated input fields in column B, and each fresh field 10', 1E', 20', 2E'. . . produced by the interpolator 48 is repeated twenty times at 60 field/s, as shown in column E, and the repeated fields are output to the frame recorder 13 (FIG. 1). One in every twenty output fields is temporarily recorded by the recorder 13, as indicated in column F in FIG. 7, and intermittently bursts of the stored fields are output at 60 field/s, to the VTR 14 (FIG. 1) (which in this case is an SMPTE 240M standard VTR) operated in an intermittent recording mode as shown by column G. Accordingly, the field rate of the material recorded by the VTR 14 is in the SMPTE 240M format.

Figure 10A:
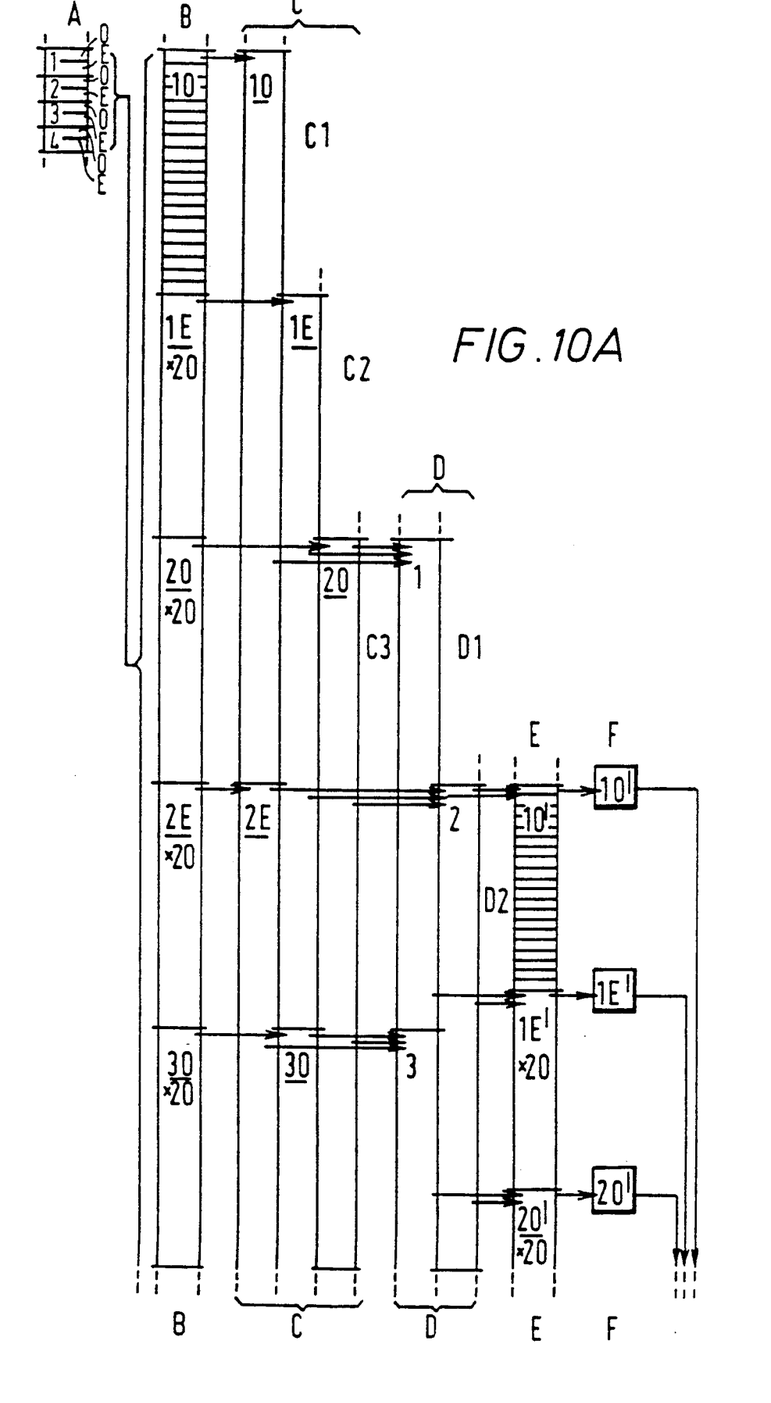
FIGS. 10A and 10B illustrate in more detail how such a conversion is carried out.
Figure 10B:
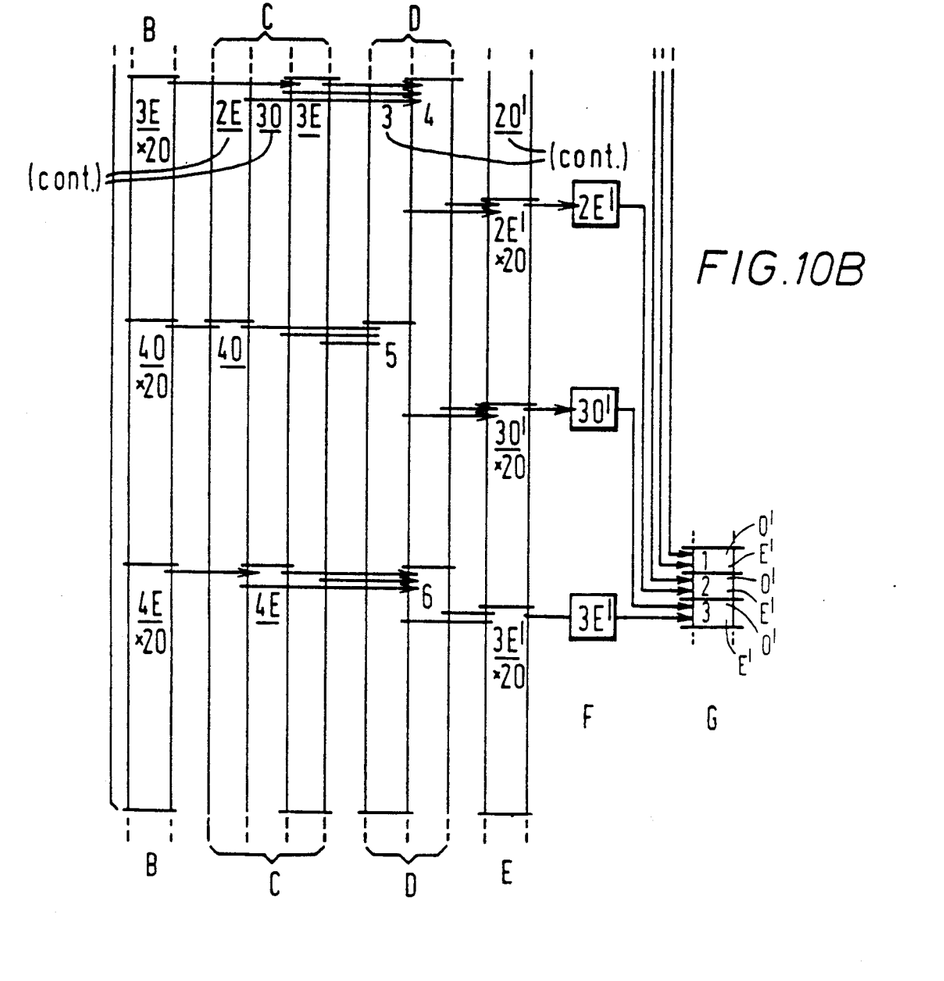

With the arrangement of FIGS. 9 and 10 the temporal resolution of the interpolator 48 must be modified analogously to that described above with reference to FIG. 8. Specifically, the first output field 10' is temporally aligned with the progressive scan frame 1, and therefore the field 10' may be generated merely by taking the odd lines of the frame 1. Alternatively, in order to reduce noise level modulation, the field 10 may be temporally interpolated at the aligned frame end of the motion vector, such that the value O(x,y) of a pixel at location (x,y) in the output field 10' is derived by averaging the value P(x,y) of the pixel at (or patch centred on) the location (x,y) in the preceding or temporally aligned frame 1 and the value $S(x+m(x,y), y+n(x,y))$ of the pixel at (or patch centred on) a location $(x+m(x,y), y+n(x,y))$ in the succeeding frame 2 which is displaced by the motion vector $(m(x,y), n(x,y))$ from the output pixel location (x,y). In other words, for output field 10':

$$O(x,y) = \{P(x,y) + S(x+m(x,y), y+n(x,y))\}/2.$$

For the next output field 1E' the output pixels are interpolated five-sixths of the way along the respective motion vectors. In other words, for output field 1E':

$$O(x,y) = \{P(x-0.833m(x,y), y-0.833n(x,y)) + S((x+0.167m(x,y), y+1.67n(x,y))\}/2.$$

It follows that, for output fields 20', 2E', 30' and 3E', the output pixels are interpolated two-thirds, one-half, one-third and one-sixth, respectively, along the respective motion vectors. That is to say:

Field 20':

$$O(x,y) = \{P(x-0.667m(x,y), y-0.667n(x,y)) + S(x+0.333m(x,y), y+0.333n(x,y))\}/2$$

Field 2E':

$$O(x,y) = \{P(x-0.500m(x,y), y-0.500n(x,y)) + S(x+0.500m(x,y), y+0.500n(x,y))\}/2$$

Field 30':

$$O(x,y) = \{P(x-0.333m(x,y), y-0.333n(x,y)) + S(x+0.667m(x,y), y+0.667n(x,y))\}/2$$

Field 3E':

$$O(x,y) = \{P(x-0.167m(x,y), y-0.167n(x,y)) + S(x+0.833m(x,y), y+0.833n(x,y))\}/2$$

It should be noted that other temporal interpolations are possible, for example 11/12, 3/4, 7/12, 5/12, 1/4 and 1/12 of the way along the respective motion vector, in which case, if pixel value weighting is also applied, the pixel values for the six fields in a series are calculated as follows:

Field 10':

$$O(x,y) = 0.083P(x-0.917m(x,y), y-0.917n(x,y)) + 0.917S(x+0.083m(x,y), y+0.083n(x,y))$$

Field 1E':

$$O(x,y) = 0.250P(x-0.750m(x,y), y-0.750n(x,y)) + 0.750S(x+0.250m(x,y), y+0.250n(x,y))$$

Field 20':

$$O(x,y)=0.417P(x-0.583m(x,y),$$
$$y-0.583n(x,y))+0.583S(x+0.417m(x,y),$$
$$y+0.417n(x,y))$$

Field 2E':

$$O(x,y)=0.583P(x-0.417m(x,y),$$
$$y-0.417n(x,y))+0.417S(x+0.583m(x,y),$$
$$y+0.583n(x,y))$$

Field 30':

$$O(x,y)=0.750P(x-0.250m(x,y),$$
$$y-0.250n(x,y))+0.250S(x+0.750m(x,y),$$
$$y+0.750n(x,y))$$

Field 3E':

$$O(x,y)=0.917P(x-0.083m(x,y),$$
$$y-0.083n(x,y))+0.083S(x+0.917m(x,y),$$
$$y+0.917n(x,y))$$

As briefly mentioned above, when converting between SMPTE 240M format and the European format, in addition to changing the field rate, it is also necessary to change the pixel height of the frame between 1035 pixels and 1152 pixels. One simple way of achieving this is to repeat or drop certain lines of pixels in the frames produced by the progressive scan converter 42 (columns D of FIGS. 7 and 10) or by the temporal interpolator 48 (columns E of FIGS. 7 and 10). For example, to expand from 1035 pixel lines to 1152 pixel lines requires the addition of 1152−1035=117 pixel lines, and this could be achieved by repeating every 1035/117=8.846th line of the column D frames, i.e. lines 8, 17, 26, 35, 44 . . . . Alternatively, to contract from 1152 pixel lines to 1035 pixel lines requires the dropping of 117 pixel lines, and this could be achieved by dropping every 1152/117=9,846th line of the column D frames, i.e. lines 9, 19, 29, 39, 49, 59, 68 . . . . However, such simple methods will produce noticeable artifacts in the picture.

In preference to such a simple method, vertical spatial interpolation may be employed using finite impulse response (FIR) filtering, as have previously been used for line number conversion when converting between conventional definition formats. For further details of such spatial interpolation, reference is directed to two articles entitled "Digitaler Video-Normwandler" (Digital Video Standards Conversion) by J. W. Richards and H. Przybyla in the journal "Fernseh & Kino Technik", vols. 2 and 3, February and March 1988, published by Dr. Alfred Hüthig Verlag Gmbh, Heidelberg, Germany.

In the case of conversion from SMPTE 240M format to European format, vertical spatial interpolation to increase the number of active pixel lines is preferably carried out by a spatial interpolator 50 (FIG. 3) after motion compensated temporal interpolation, because temporal interpolation is the more processing intensive of these two interpolation operations, and thus temporal interpolation is performed on a fewer number of pixels per field. On the other hand, in the case of conversion from European format to SMPTE 240M format, vertical spatial interpolation is preferably carried out before temporal interpolation, for example by a spatial interpolator 51 (FIG. 4) before or as part of the progressive scan converter 42, in order to reduce then number of pixels per field upon which temporal interpolation is performed.

Having described a preferred embodiment of the invention with reference to the accompanying drawings, it is to be understood that the invention is not limited to the precise embodiment and that various changes and modification thereof may be effected by one skilled in the art without departing from the spirit or scope of the invention as defined in the appended claims.

What is claimed is:

1. A method of converting an input digital video signal to an output digital video signal wherein the input and output signals have different frame rates and different numbers of pixel lines per frame, the method comprising the steps of:

forming a first series of progressive scan format frames from the input signal;

temporally interpolating selected ones of said progressive scan format frames using temporally offset motion vectors and pixel weights to provide the difference in frame rate, said pixel weights for each of said progressive scan format frames being different than the temporal offsets for said each of said progressive scan format frames, thereby forming a second series of frames; and performing vertical spatial interpolation so as to provide the difference in the number of pixel lines per frame.

2. A method as claimed in claim 1, wherein the output video signal has a greater number of active pixel lines per frame than the input video signal, and wherein said step of performing vertical spatial interpolation is performed after said step of temporally interpolating.

3. A method as claimed in claim 1, wherein the output video signal has a lesser number of active pixel lines per frame than the input video signal, and wherein said step of performing vertical spatial interpolation is performed before said step of temporally interpolating.

4. A method as claimed in claim 1 for use in the case where said input signal has a 2:1 interlaced field scan format, wherein a respective frame in said first series is formed for each field of the input signal.

5. A method as claimed in claim 4, wherein the fields of the input signal are repeated with a repeat rate of N times, and a new frame of said first series is produced for every N fields of the repeating input signal.

6. A method as claimed in claim 1, wherein said step of performing vertical spatial interpolation includes finite impulse response filtering of lines of pixels in one of said input digital video signal and said second series of frames.

7. A method as claimed in claim 1 for use in the case where the output signal has a 2:1 interlaced field scan format, wherein each frame of said second series comprises a pair of 2:1 interlaced fields and different amounts of temporal interpolation are used for successive fields of said second series.

8. A method as claimed in claim 7, wherein:

said input signal has a 2:1 interlaced field scan format with a field rate of 60 Hz;

said output signal has a 2:1 interlaced field scan format with a lower field rate of 50 Hz; and four of a group of five successive fields in said second series are produced by temporal interpolation o+0.2, o+0.4, o+0.6 and o+0.8 (where o is a constant offset), respectively, of the way between respective successive frames in said first series.

9. A method as claimed in claim 8, wherein said constant offset "o" is 0.1.

10. A method as claimed in claim 8, wherein said constant offset "O" is zero.

11. A method as claimed in claim 10, wherein the remaining field of said group is produced without temporal interpolation.

12. A method as claimed in claim 7, wherein:
said input signal has a 2:1 interlaced field scan format with a field rate of 50 Hz;
said output signal has a 2:1 interlaced field scan format with a higher field rate of 60 Hz; and
five of a group of six successive fields in said second series are produced by temporal interpolation in the ratios o+0.833, o+0.667, o+0.5, o+0.333 and o+0.167 (where o is a constant offset), respectively, of the way between respective successive frames in said first series.

13. A method as claimed in claim 12, wherein said constant offset "o" is 0.083.

14. A method as claimed in claim 12, wherein said constant offset "o" is zero.

15. A method as claimed in claim 14, wherein the remaining field of said group is produced without temporal interpolation.

16. A method as claimed in claim 8, wherein the remaining field in said group is produced by temporal interpolation "o" of the way between respective successive frames in said first series.

17. A digital video signal conversion apparatus, comprising:
a digital video signal reproducing apparatus for providing a source digital video signal having a first frame rate and a first number of pixel lines per frame;
a digital video signal recording apparatus for recording a supplied digital video signal having a second frame rate different to said first frame rate and a second number of pixel lines per frame different to said first number;
means for forming a first series of progressive scan format frames from said source digital video signal;
means for temporally interpolating selected ones of said progressive scan format frames using temporally offset motion vectors and pixel weights to provide the difference in frame rate, said pixel weights for each of said progressive scan format frames being different than the temporal offsets for said each of said progressive scan format frames, thereby forming a second series of frames; and
means for performing vertical spatial interpolation so as to provide the difference in the number of pixel lines per frame between the source digital video signal and the supplied digital video signal.

* * * * *